United States Patent [19]
Takiyama et al.

[11] 3,978,155
[45] Aug. 31, 1976

[54] CURABLE RESINOUS COMPOSITION COMPRISING COMBINATION OF POLYMERIZABLE CYCLOACETAL COMPOUND WITH UNSATURATED POLYESTER

[75] Inventors: Eiichiro Takiyama, Kamakura; Toshiaki Sugimoto; Toshiaki Hanyuda, both of Yokohama, all of Japan

[73] Assignee: Showa High Polymer Co., Ltd., Tokyo, Japan

[22] Filed: Dec. 27, 1974

[21] Appl. No.: 536,912

[52] U.S. Cl. .................... 260/836; 260/837 R; 260/861; 260/867; 260/873
[51] Int. Cl.$^2$ ................... C08L 63/10; C08L 67/06
[58] Field of Search ............... 260/836, 837 R, 861, 260/873, 862, 867, 67 UC, 73

[56] References Cited
UNITED STATES PATENTS

| | | | |
|---|---|---|---|
| 2,895,945 | 7/1959 | Fischer et al. | 260/837 R |
| 3,247,282 | 4/1966 | Englisch et al. | 260/861 |
| 3,296,337 | 1/1967 | Zimmermann | 260/867 |
| 3,311,674 | 3/1967 | MacArthur | 260/67 UC |
| 3,449,272 | 6/1969 | Wismer et al. | 260/67 UC |
| 3,471,430 | 10/1969 | Zimmermann et al. | 260/67 UC |
| 3,714,291 | 1/1973 | Rockey | 260/861 |

FOREIGN PATENTS OR APPLICATIONS

| | | | |
|---|---|---|---|
| 757,573 | 9/1956 | United Kingdom | 260/867 |

*Primary Examiner*—Murray Tillman
*Assistant Examiner*—Thurman K. Page
*Attorney, Agent, or Firm*—Wenderoth, Lind & Ponack

[57] ABSTRACT

This invention relates to a curable resinous composition which comprises a combination of (I) a curable resinous compound prepared by reacting 1 mol of (a) an unsaturated polycycloacetal, 0.1 to 3 mols of (b) an ester of a polyhydric alcohol/unsaturated monocarboxylic acid, having an alcoholic hydroxyl group and a polymerizable unsaturated bond in the same molecule, and 0 to 2.9 mols of (c) a polyhydroxy compound such as polyols, polyethers and polyesters, with (II) an unsaturated polyester.

1 Claim, No Drawings

CURABLE RESINOUS COMPOSITION COMPRISING COMBINATION OF POLYMERIZABLE CYCLOACETAL COMPOUND WITH UNSATURATED POLYESTER

This invention relates to an improvement of the invention disclosed in our U.S. Pat. No. 3,933,857, application Ser. No. 407,626 filed on Oct. 18, 1973, owned by the present assignee.

glycerinedimethacrylate to provide an addition monomer in which the alcoholic hydroxyl group in the ester is added to the double bond in the cycloacetal. The above addition reaction is completed without producing substitution reaction products or any other by-products, and accordingly the reaction can easily be carried out in a simple and inexpensive apparatus. This modification is fully disclosed in our U.S. Pat. No. 3,933,857. An example of the above addition reaction is illustrated by the following chemical equation.

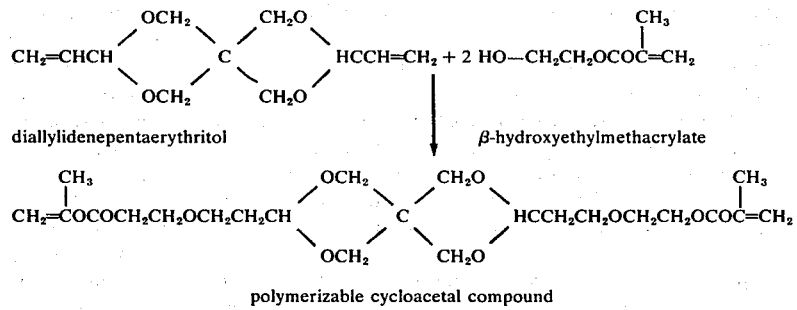

This invention relates to a curable resinous composition, more particularly a combination of (I) a curable resinous compound prepared by reacting (a) an unsaturated polycycloacetal, (b) an ester of a polyhydric alcohol/unsaturated monocarboxylic acid, having an alcoholic hydroxyl group and a polymerizable unsaturated bond in the same molecule, and optionally (c) a polyhydroxy compound with (II) an unsaturated polyester.

Cycloacetal compounds prepared by the condensation of polyhydric alcohols such as pentaerythritol and sorbitol with unsaturated aldehydes such as crotonaldehyde and acrolein are well known as spiroacetal resins. Among them, diallylidene pentaerythritol prepared by the condensation of pentaerythritol with acrolein and triallylidene sorbitol prepared by the condensation of sorbitol with acrolein are valuable since the double bond in these structures has a special reactivity, and it is well known that they react with the active hydrogens of polycarboxylic acids, polyhydric alcohols, polythiokols or phenols to produce thermoplastic or thermosetting resins.

However, such a double bond is not satisfactory in respect of radical polymerizability, and therefore its utility is limited.

We have studied the various properties of these cycloacetal groups, and found that they can be modified so as to have satisfactory radical polymerizability without damaging their essential features by incorporating acryl or methacryl groups. This modification of the cycloacetal is based on the properties that a double bond in the cycloacetal such as diallylidene pentaerythritol and triallylidene sorbitol react readily with an alcoholic hydroxyl group without coloring, and that unsaturated bonds in acryl or methacryl groups to be introduced readily polymerize or copolymerize with the same kinds or different kinds of polymerizable monomers both at low and high temperatures. This modification is carried out by reacting the cycloacetal with an ester of a polyhydric alcohol/unsaturated monocarboxylic acid, having an alcoholic hydroxyl group and a polymerizable unsaturated bond in the same molecule, for example hydroxyethylmethacrylate, trimethylolpropanedimethacrylate and These addition products can be used alone as monomers or low viscosity resins. However, the use of these unsaturated cycloacetals alone sometimes produces the disadvantages that, when fillers, pigments and the like are mixed with the cycloacetal resins, they are not compatible with the resin and therefore even color or favourable thixotropy cannot be obtained, since the resin does not have functional groups such as hydroxyl or carboxyl groups in the molecule.

We have found that the above disadvantages can be removed by combining these polymerizable cycloacetal compounds with prepolymers, for example, unsaturated polyesters, having functional groups such as carboxyl and/or hydroxyl groups in the molecule, which are copolymerizable with the cycloacetal compounds, and of which the molecular weight can easily be controlled.

Conversely speaking, unsaturated polyesters are improved with respect to not only operations efficiency but also adhesive strength and driability in air by replacing a part or the whole part of conventionally used styrene with a polymerizable cycloacetal compound which is a low volatile monomer. Thus, the two components improve each other.

Polycrotonaldehyde acetal, polyacrolein acetal and the like can be used as polycycloacetal compound (a), and they are synthesized by the H. Schulz Method disclosed in "Angew. Chem." (vol. 62, No. 5, pp. 105 – 118, 1950). However, among these acetals, polyacrolein acetal, particularly diallylidenepentaerythritol and triallylidene sorbitol are preferable in order to obtain a desired product having a light color by reaction with the alcoholic ester (b).

Examples of an ester of a glycol/unsaturated monocarboxylic acid or a polyhydric alcohol/unsaturated monocarboxylic acid (b) having an alcoholic hydroxyl group and a polymerizable unsaturated bond selected from acryl and methacryl groups in the same molecule, include hydroxyethyl (or hydroxypropyl)methacrylate, hydroxyethyl (or hydroxypropyl)acrylate, trimethylolpropanediacrylate, trimethylolpropanedimethacrylate, trimethylolethanediacrylate, trimethylolethanedimethacrylate, glycerinediacrylate, glycerinedimethacrylate, pentaerythritoltriacrylate, pentaerythritoltrimethacrylate and the like. An unsaturated alcohol such as allylalcohol is not suitable for this invention since it does not cure well at room temperature.

Examples of suitable polyhydroxy compound (c) having at least two hydroxyl groups in a molecule include polyols, polyethers, polyesters and the like, more particularly various polyhydric alcohols, polyethylene glycol, polypropylene glycol, a blockpolymer of polyethylene glycol/polypropylene glycol, a hydroxy polyester having a terminal or branch chain hydroxyl group, polybutadiene having a terminal hydroxy group and the like. These compounds are selected optionally depending on use.

The above components (a), (b) and (c) may be reacted all at once or divisionally.

In addition to the above components (a), (b) and (c), unsaturated polyester (II) is also an essential component of the resinous composition of this invention.

The unsaturated polyester used in this invention includes unsaturated alkyds and epoxyacrylates (or vinyl esters).

The unsaturated alkyd is prepared by esterifying an $\alpha,\beta$-unsaturated polycarboxylic acid (which may optionally be modified with a saturated polycarboxylic acid) with a polyhydric alcohol. The unsaturated alkyd is used by being dissolved in vinyl-type or acryl-type monomers. The $\alpha,\beta$-unsaturated polycarboxylic acid includes maleic anhydride, maleic acid, fumaric acid, itaconic acid, itaconic anhydride and the like. The saturated polycarboxylic acid used in the modification includes phthalic anhydride, isophthalic acid, terephthalic acid, endomethylenetetrahydrophthalic anhydride, tetrahydrophthalic anhydride, methyltetrahydrophthalic anhydride, succinic acid, adipic acid, axelaic acid, sebacic acid, tetrachlorophthalic anhydride, tetrabromophthalic anhydride, chlorendic acid and the mixture thereof. The polyhydric alcohol used in the esterification with the above polycarboxylic acids includes ethylene glycol, propylene glycol, dipropylene glycol, diethylene glycol, neopentyl glycol, hydrogenated bisphenol A, butanediol-1,3, butanediol-1,4, hexanediol-1,6, an addition product of bisphenol A and ethylene oxide, an addition product of bisphenol A and propylene oxide, dibromoneopentyl glycol, and the like. Monoepoxy compounds such as ethylene oxide and propylene oxide which provide polyesters in the same manner as glycol are also suitable starting materials.

The epoxyacrylate used in this invention is a reaction product of an epoxy compound containing at least one epoxy group in the molecule with an unsaturated monocarboxylic acid such as acrylic acid and methacrylic acid (a part of which may optionally be replaced by a polycarboxylic acid or its anhydride; or by a saturated or unsaturated alkyd having a terminal carboxyl group). The epoxy compound used in the preparation of the epoxyacrylate includes bisphenol type epoxy resins; diglycidyl esters of polybasic acids such as phthalic acid diglycidyl ester, hexahydrophthalic anhydride diglycidyl ester and adipic acid diglycidyl ester; and an epoxy resin which is obtained by oxidizing a double bond in a molecule, for example "Unox" epoxides 221, 206 and 207 sold by Union Carbide Co.

A novel curable resinous composition of this invention is a combination of (I) a curable resinous compound prepared by reacting 1 mol of (a) unsaturated polycycloacetal, 0.1 to 3 mols of (b) an ester of a polyhydric alcohol/unsaturated monocarboxylic acid, having an alcoholic hydroxyl group and a polymerizable unsaturated bond in the same molecule, and 0 to 2.9 mols of (c) a polyhydroxy compound, with (II) an unsaturated polyester. The mixing ratio of the curable resinous compound (I) with the unsaturated polyester (II) is varied depending on use. Typically, 10 – 95% of the curable resinous compound (I) is mixed with 5 – 90% of the unsaturated polyester (II).

The resinous composition of this invention may optionally contain monomers, thermoplastic polymers, inorganic or organic fillers, reinforcing material, pigments, lubricants, catalysts or the like.

This invention is illustrated by the following examples.

EXAMPLE 1

Synthesis of polymerizable cycloacetal compound (A)

212 g of diallylidenepentaerythritol, 210 g of $\beta$-hydroxyethyl methacrylate, 1.5 g of para-toluenesulfonic acid and 0.4 g of hydroquinone were reacted in a 1 liter four-necked flask equipped with a reflux condenser, stirrer, thermometer and inlet tube for an inert gas at 80°– 90°C for 8 hours under an inert gas stream. 85% of the hydroxyl groups reacted to produce a light yellowish brown liquid resin (A) (polymerizable cycloacetal compound) having a low viscosity of about 3 poises.

Synthesis of unsaturated alkyd (B)

820 g of propylene glycol, 490 g of maleic anhydride and 740 g of phthalic anhydride were placed in a three liter four-necked flask equipped with a stirrer, fraction condenser, thermometer and inlet tube for nitrogen gas, and the reaction mixture was esterified at 190°–210°C in a nitrogen gas stream until the acid value of the esterification product became 39.4. Thereafter 0.18 g of hydroquinone was added to the reaction product and the mixture was cooled to prepare a fragile light yellow resin (B).

The resins (A) and (B) thus obtained were blended with each other in the following ratios, and the physical properties of the blended resins were tested. It is clear from the results shown in Table 1 that the combination of the two resins is very suitable for various uses.

Table 1

| Resins | | Gelling time | Physical properties of coated film (0.2 mm)* Drying time (determined by finger test) | Sword hardness** | State of color*** | Bending strength of cast product (kg/cm²) |
|---|---|---|---|---|---|---|
| Resin (A) | 65% | indefinite | sticky | unmeasurable | even color | 9.1 |
|  |  | (2–3 hours) |  |  |  |  |
| Styrene | 35% |  |  |  |  |  |
| Resin (A) | 50% | 39 mins. | 80 mins. | 51 | even color | 8.7 |

Table 1-continued

| Resins | | Physical properties of coated film (0.2 mm)* | | | | Bending strength of cast product (kg/cm²) |
|---|---|---|---|---|---|---|
| | | Gelling time | Drying time (determined by finger test) | Sword hardness** | State of color*** | |
| Resin (B) | 50% | | | | | |
| Resin (A) | 100% | 60 mins. | 100 mins. | 59 | little uneven | 8.8 |
| Resin (A) | 50% | | | | | |
| Resin (B) | 30% | 23 mins. | 47 mins. | 49 | even | 11.4 |
| Styrene | 20% | | | | | |
| Resin (A) | 30% | | | | | |
| Resin (B) | 50% | 20 mins. | 50 mins. | 41 | even | 11.9 |
| Styrene | 20% | | | | | |
| Resin (A) | 80% | | | | | |
| | | 48 mins. | 90 mins. | 53 | uneven | 10.3 |
| Stryrene | 20% | | | | | |

*1 part of methylethyl ketone peroxide and 0.8 part of cobalt naphthenate (Co=6%) are included as curing agents per 100 parts of resin.
**Sword hardness was measured at 25°C after 48 hours.
***Pigments used include blue type, cobalt blue, phthalocyanine green, red oxide of iron and titanium white.

EXAMPLE 2

Synthesis of polymerizable cycloacetal compound (C)

212 g of diallylidenepentaerythritol, 220 g of β-hydroxyethylacrylate, 1.2 g of paratoluene sulfonic acid and 0.15 g of hydroquinone were placed in the same type of flask as used in Example 1, and were reacted at 90°–95°C for 5 hours to produce a light yellowish brown liquid resin (C) (cycloacetal compound) having a low viscosity of about 2.9 poises.

Synthesis of flame retardant unsaturated alkyd resin (D)

660 g of ethylene glycol, 1500 g of HET acid (chlorendic acid) and 490 g of maleic anhydride were placed in the same type of flask as used in Example 1 to prepare the resin (B), and were esterified at 170°–180°C in an inert gas stream. Then 0.22 g of hydroquinone was added to the esterification product to produce a fragile light yellow solid unsaturated alkyd resin (D) having an acid value of 41.4.

The resins (C) and (D) thus obtained were blended with each other in the following ratios.

| | |
|---|---|
| Polymerizable cycloacetal resin (C) | 40% by weight |
| Unsaturated alkyd resin (D) | 40% |
| Trichloroethylphosphate | 10% |
| Methylmethacrylate | 10% |

1 part of benzoyl peroxide was added to 100 parts of the above mixture, and the mixture was cured at 80°C. The cured product was tested with respect to flame retardance in accordance with ASTM-D-757. The test showed that the burning rate of the test piece was 0.12 inch/min., and that it was self-extinguishing. Thus, this is a good flame retardant material.

A laminated plate having a glass content of 31% was prepared by impregnating a glass mat (No. 450) with a mixture of 100 parts of the above prepared flame retardant resin and 100 parts of hydrated alumina including a curing system of benzoyl peroxide and dimethylaniline. This laminated plate having a size of 1 m × 1 m × 2 mm was contacted with the flame of a petroleum burner having a flame length of 50 cm. The plate burnt while it was contacted with the flame, but extinguished as soon as the flame was removed. The plate produced only a small amount of light brownish smoke while burning.

On the other hand, a commercially available flame retardant unsaturated polyester containing styrene burnt at a burning rate of 0.2 inch/minute producing a large amount of black smoke when it was contacted with a burner. Moreover, the flame remained for about 30 seconds after the burner was removed.

EXAMPLE 3

Synthesis of polymerizable cycloacetal (E)

1000 g of 1,2-polybutadiene having a terminal hydroxyl group and a molecular weight of about 2000, 212 g of diallylidene pentaerythritol, 290 g of β-hydroxypropylmethacrylate, 4.5 g of p-toluenesulfonic acid and 0.3 g of hydroquinone were placed in a 2 liter four-necked flask equipped with a stirrer, cooling tube, thermometer and inlet tube for inert gas, and were reacted at 90°–95°C for 5 hours in the atmosphere of inert gas. According to an infrared ray analysis, it was proved that 87% of the hydroxyl groups had reacted. When the reaction contents became too viscous to stir at the end of the reaction, it was possible to continue the reaction by adding 200 g of styrene to the reaction mass. After the reaction, a reddish brown unsaturated spiroacetal resin (E) was prepared by adding 3 g of dimedone and styrene in an amount to reach 1000 g in all.

Synthesis of epoxyacrylate (F)

370 g of "Epikote 877" (epoxyequivalent = 186), 92 g of endomethylenetetrahydrophthalic anhydride, 86 g of methacrylic acid, 1.7 g of trimethylbenzylammonium chloride and 0.15 g of hydroquine were placed in a 1 liter three-necked flask equipped with a stirrer, cooling tube and thermometer, and were reacted at 125°–130°C for 3½hours to produce a reaction product having an acid value of 6.9. A light reddish brown epoxyacrylate resin (F) having a low viscosity of 8.7 poises was prepared by adding 350 g of styrene to the above reaction product.

A ring washer (outside diameter = 5 cm, inside diameter = 4 cm, and thickness = 0.5 cm) having one end broken was suspended 2.5 cm above the bottom of a 300 cc beaker made of polypropylene. The above prepared resins respectively containing 2 parts of cumenehydroperoxide and 1 part of cobalt naphthenate per 100 parts of resin were poured into the beaker to a depth of 5 cm, and were cured at 25°C. The cast products were subjected to a heat-shock test by leaving them at −30°C for 30 minutes and 80°C for 30 minutes repeatedly. The results thereof are shown in Table 2.

As can be seen from Table 3, it is clear that the physical properties of the resins (G) and (H) are synergistically improved when the two resins are combined.

Table 3

| Test Resin | | Physical property of film* | | Physical property of cast product | | Physical property of laminate*** | |
|---|---|---|---|---|---|---|---|
| | | Crack on a resin coating having a thickness of 1cm** | Sword hardness of film surface | Heat distortion temperature (°C) | Bending strength (kg/mm²) | Bending strength (kg/mm²) | Bending strength after being boiled for 150 hours (kg/mm²) |
| Unsaturated polyester (H) | | crack occurs | slightly sticky 15–16 | 153 | 6.9 | 15.4 | 10.4 |
| Polymerizable cycloacetal (G) Unsaturated polyester (H) | 70% | no crack | 51 | 147 | 10.4 | 22.6 | 18.0 |
| Polymerizable cycloacetal (G) Unsaturated polyester (H) | 30% 50% | no crack | 37 | 169 | 9.9 | 21.1 | 18.6 |
| Polymerizable cycloacetal (G) Unsaturated polyester (H) | 50% 30% | no crack | 62 | 171 | 12.7 | 23.9 | 18.6 |
| Polymerizable cycloacetal (G) | 70% | no crack | 59 | 158 | 13.9 | 24.9 | 20.3 |

*The resins were cured in the presence of 1 part of methylethylketone peroxide and 0.8 part of cobalt naphthenate (Co=6%) per 100 parts of resin.
**The resin coating comprised 100 parts of resin and 200 parts of talc.
***The laminate comprised glass mat (No. 450), and had a thickness of 3 mm and glass content of 31%.

Table 2

| Test Resin | | Surface driability | Anti-cracking property (times of heat shock test to occur cracking) | Volume shrinkage ratio (%) |
|---|---|---|---|---|
| Epoxyacrylate (F) | 100% | slightly sticky | 1 time | 7.9 |
| Unsaturated spiroacetal (E) Epoxyacrylate (F) | 100% 70% | completely cured | more than 20 times | 6.1 |
| Unsaturated spiroacetal (E) Epoxyacrylate (F) | 30% 50% | non-sticky | 5 times | 3.2 |
| Unsaturated spiroacetal (E) Epoxyacrylate (F) | 50% 30% | completely cured | more than 20 times | 1.7 |
| Unsaturated spiroacetal (E) | 70% | completely cured | more than 20 times | 4.1 |

EXAMPLE 4

Synthesis of unsaturated spiroacetal (G)

212 g of diallylidene pentaerythritol, 560 g of trimethylolpropanedimethacrylate, 2.5 g of p-toluenesulfonic acid and 0.5 g of hydroquinone were placed in the same type of flask as used in Example 1, and were reacted at 85°C for 12 hours in an atmosphere of nitrogen to produce a light reddish brown unsaturated cycloacetal (G) having a viscosity of 6.3 poises. According to an infrared ray analysis, it was proved that almost 90% of the hydroxyl groups had reacted.

Synthesis of unsaturated polyester (H)

410 g of propylene glycol and 580 g of fumaric acid were placed in a 2 liter four-necked flask equipped with a stirrer, thermometer, fraction condenser and inlet tube for inert gas, and were esterified at 180 – 190°C in the atmosphere of an inert gas. The esterification product having an acid value of 44.3 was mixed with 0.2 g of hydroquinone and 600 g of styrene to prepared unsaturated polyester (H).

EXAMPLE 5

Synthesis of unsaturated spiroacetal (I)

320 g of diallylidene pentaerythritol, 130 g of dibromoneopentyl glycol, 210 g of β-hydroxyethylmethacrylate, 2 g of an ether addition product of boron trifluoride and 0.13 of hydroquinone were placed in the same type of flask as used in Example 1, and were reacted at 90 – 95°C for 5 hours. According to an infrared ray analysis, it was proved that 90 – 91% of the hydroxyl groups had reacted. The above prepared unsaturated spiroacetal (I) cooled to room temperature was a light reddish brown viscous liquid.

Synthesis of epoxyacrylate (J)

310 g of hexahydrophthalic acid glycidyl ester, 172 g of methacrylic acid, 1.5 g of diethylamine hydrochloride and 0.15 g of hydroquinone were placed in the same type of 1 liter three-necked flask as used in Example 3, and were reacted at 120°– 125°C for 4 hours to produce a light yellowish brown liquid having a viscosity of about 60 poises and an acid value of 11.3.

Molding compositions were prepared by using the above prepared resins in the following formulation.

| Resin | 100 parts |
| --- | --- |
| Antimony trioxide | 3 parts |
| Hydrated alumina | 80 parts |
| Calcium carbonate | 100 parts |
| ¼ inch glass fiber | 25 parts |
| Tert-butyl perbenzoate | 2 parts |
| Zinc stearate | 4 parts |

The physical properties of the above prepared molding compositions were tested and the results are shown in Table 4.

Table 4

| Test Resin | | Flame retardance | Anti-tracking property (600V) | After being subjected to a weather meter test for 500 hours | |
| --- | --- | --- | --- | --- | --- |
| | | | | Maintenance of bending strength | Appearance |
| Unsaturated spiroacetal (I) | | flame retardant* | more than 51 drops depth = 0.26 mm | 91% | Color was slightly changed to yellow. Glass was retained. |
| Unsaturated spiroacetal (I) Epoxyacrylate (J) | 50% 50% | flame retardant | more than 51 drops depth = 0.19 mm | 108% | Color was very slightly changed to yellow. Glass was retained. |
| Epoxyacrylate (J) | | semi-flame retardant** | more than 51 drops depth = 0.18 mm | 106% | Substantially no change |

*"Flame retardant" means that the composition passed SE-O level of UL Standard.
**"Semi-flame retardant" means that the composition passed SE-1 level of UL Standard.

What we claim is:

1. A curable resinous composition which comprises
I. 10–95% of a curable resinous compound prepared by reacting (a) 1 mol of an unsaturated polycycloacetal selected from the group consisting of diallylidene pentaerythritol and triallylidene sorbitol, (b) 0.1 to 3 mols of an ester selected from the group consisting of hydroxyethyl methacrylate, hydroxypropyl methacrylate, hydroxyethyl acrylate, hydroxypropyl acrylate, trimethylolpropanedimethacrylate, trimethylolpropanediacrylate, trimethylolethanedimethacrylate, trimethylolethanediacrylate, glycerinedimethacrylate, glycerinediacrylate, pentaerythritoltriacrylate and pentaerythritoltrimethacrylate and (c) a positive amount, up to 2.9 mols, of a polyhydroxy compound selected from the group consisting of polyhydric alcohols, polyethylene glycol, polypropylene glycol, a polyethylene glycol/polypropylene glycol block polymer, a hydroxy polyester having a terminal or branch chain hydroxyl group and polybutadiene having a terminal hydroxy group, and
(II) an unsaturated polyester selected from the group consisting of (1) unsaturated alkyds, (2) an epoxy acrylate prepared from a mixture containing an epoxy compound an unsaturated mono carboxylic acid and (3) mixtures thereof.

* * * * *